W. M. APPLE.
PARCEL CARRIER FOR BICYCLES.
APPLICATION FILED APR. 8, 1914.
1,134,577.
Patented Apr. 6, 1915.
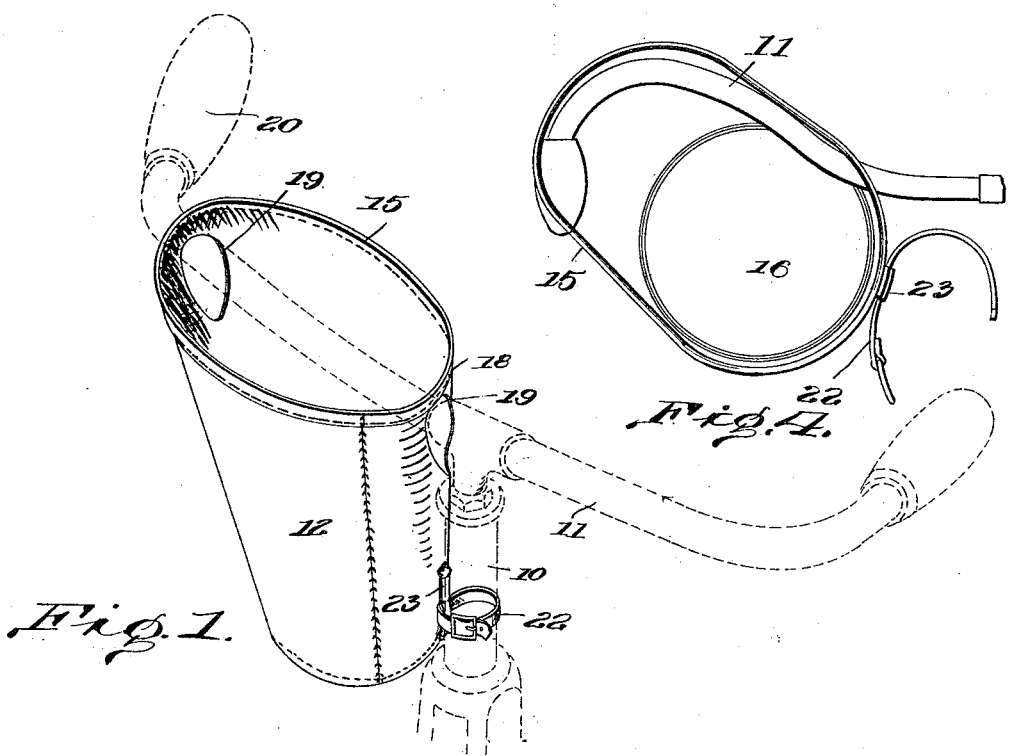
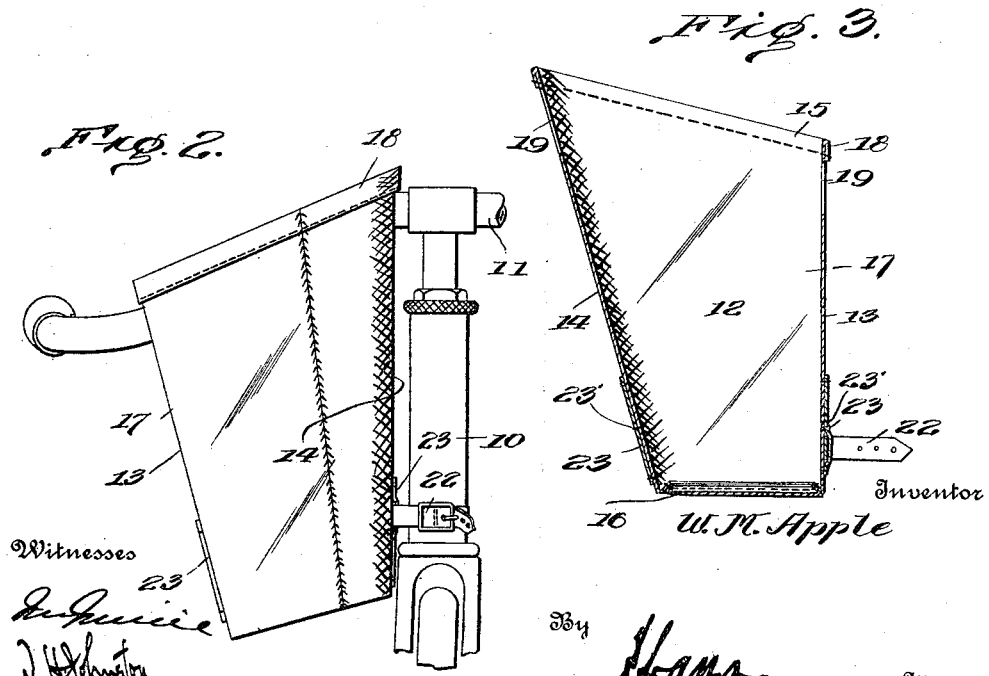

UNITED STATES PATENT OFFICE.

WILLIAM M. APPLE, OF SAN ANTONIO, TEXAS.

PARCEL-CARRIER FOR BICYCLES.

1,134,577.  Specification of Letters Patent.  Patented Apr. 6, 1915.

Application filed April 8, 1914. Serial No. 830,467.

*To all whom it may concern:*

Be it known that I, WILLIAM M. APPLE, a citizen of the United States, residing at San Antonio, in the county of Bexar and State of Texas, have invented certain new and useful Improvements in Parcel-Carriers for Bicycles, of which the following is a specification.

This invention relates to parcel carriers especially adapted for attachment to bicycles, the carrier being so constructed as to be readily attachable to or detachable from the handle bars of a bicycle.

The invention has for its primary object to provide a device of this character which will be simple in construction, and thus capable of ready manufacture, and which may be readily used in connection with the ordinary type of bicycle as now put on the market.

A further object of the invention is to provide an article carrier so constructed that it may be used either upon bicycles having relatively straight handle bars or upon bicycles having the drop type of handle bar, the invention being adapted for such use without the necessity of change or adjustment therein in order to effect the attachment of the carrier with such types of handle bars.

A still further object of the invention is to provide a parcel carrier adapted for attachment to the handle bars of a bicycle, and so constructed that the carrier may also be readily attached to the adjacent front post of the bicycle to thus securely hold the carrier in position. And a still further object of the invention is to generally improve the construction and increase the efficiency of devices of the above described character.

With these and other objects in view my invention will be more fully described illustrated in the accompanying drawings and then specifically pointed out in the claims which are attached to and form a part of this application.

In the accompanying drawings: Figure 1 is a perspective view showing my improved parcel carrier positioned upon one arm of the handle bars of a bicycle, such bars being of the relatively straight type and being conventionally shown. Fig. 2 is a front elevation showing my improved carrier applied to one arm of the handle bars of a bicycle, such bars being of the drop type and being conventionally shown. Fig. 3 is a vertical sectional view of the carrier, and Fig. 4 is a top plan view showing the manner in which relatively large articles may be inserted within the carrier.

Corresponding and like parts are referred to in the following description and indicated in all the views of the drawings by the same reference characters.

My improved parcel carrier is designed for attachment to the handle bars of bicycles as now manufactured and in the drawings, I have shown for the purpose of illustration, the front post 10 of a bicycle to which is connected the handle bars 11.

My improved carrier is so constructed, as will presently be explained, that it may be attached to handle bars of the relatively straight type as shown in Fig. 1 of the drawings, and may also be attached to handle bars of the drop type as shown in Fig. 2 of the drawings. The handle bars disclosed in both instances are, as above stated, merely conventionally shown for the purpose of illustration.

Coming now more particularly to the subject of the present invention, my improved carrier includes preferably a substantially frusto-conical receptacle 12, one side 13 of which is disposed substantially parallel to the vertical axis of the receptacle while the opposite side 14 is disposed to extend at an acute angle to such vertical axis. The upper free edge 15 of the receptacle 12 is preferably inclined toward the side 13 thereof as shown, while the bottom wall 16 which closes the receptacle at one end is disposed to extend at right angles to the side 13. In other words, the receptacle 12 is preferably formed in the shape of a frustum of a scalene cone. The receptacle 12 may be formed of any suitable material but is preferably made of fabric such as duck or canvas, the vertically extending walls 17 of the receptacle being stitched or otherwise secured together at the extremities thereof as shown.

Secured to the wall 17 of the receptacle at the converging extremity thereof is the bottom wall 16, such wall overlapping adjacent its periphery the adjacent edge of the wall 17 and being stitched or otherwise secured thereto. A hem 18 is preferably provided at the free edge of the wall 17, such hem not only serving to reinforce the wall 17 at its free edge but also preventing the material forming the receptacle from becoming frayed. Formed in the wall 17 of the receptacle adjacent the upper end thereof and upon opposite sides of the receptacle are preferably circular apertures 19, said apertures being of such size as to permit the hand grip 20 to pass therethrough.

As shown in Fig. 1 of the drawings, the receptacle 12 is designed to be supported upon one arm of the handle bar 11, said arm being passed through the apertures 19 formed in the receptacle, and it may here be noted that my improved device is especially adapted for attachment to the handle bars of motorcycles as now in common use. When thus used upon handle bars of the substantially straight type, or upon handle bars, the extremities of which are deflected upwardly, slightly, the side 13 of the receptacle is disposed adjacent the post 10. Owing to the inclination of the wall 17 at its free extremity, it will be noted that the angular disposition of the side 13 and the free edge 15 of the receptacle will conform to the relative angle of the handle bars 11 and of the post 10. As a consequence, the receptacle will be so supported by the arm of the handle bars that the wall 13 thereof will be disposed substantially parallel with the post 10 to which the adjacent inner extremity of the receptacle is preferably secured by a suitable strap 22, said strap passing around the post 10 as best shown in Fig. 1 of the drawings. The strap 22 may be secured to the adjacent portion of the wall 17 in any suitable manner, but is preferably detachably connected with a vertically arranged strap 23 which is secured at its extremities, preferably by stitching, to the wall 17, a transverse line of stitching 23' connecting the strap intermediate the ends thereof with the receptacle and defining vertically arranged loops. In this connection it should be observed that a strap 23 is secured upon each side of the receptacle, said straps being oppositely disposed.

Attention is here called to the fact that the apertures 19 are disposed immediately adjacent the inner edge of the hem 18. Thus, when the receptacle is positioned upon the handle bars, the hem 18 will serve to reinforce the walls 21 of said apertures and will materially assist in supporting any weight carried by the receptacle. Furthermore, by this construction, tearing of the walls of the apertures 19 due to excessive weight carried by the receptacle is prevented.

My improved package carrier is also adapted for use on handle bars of the drop type, and may be so used by simply reversing the receptacle from the arrangement shown in Fig. 1 of the drawings. In other words, when using the receptacle in connection with handle bars such as are illustrated in Fig. 1 of the drawings, the wall 13 of the receptacle is disposed adjacent the post 10. When the carrier is used upon handle bars of the drop type, the side 14 of the receptacle is disposed adjacent the post 10. This is best shown in Fig. 2 of the drawings. By thus reversing the receptacle, it will be noted that the inclined free edge 15 thereof will conform to the curvature of the adjacent arm of the handle bars 11 to which the receptacle is attached. Thus, the apertures 19 will be so disposed as to receive the arm of the handle bars, the adjacent side 14 of the receptacle being disposed substantially parallel with the post 10. It will therefore be seen that my improved carrier may be readily used upon handle bars, both of the relatively straight type or upon handle bars of the drop type with equal facility, the change in the adaptation of the invention merely necessitating the reversal thereof. It will of course, be understood that the strap 22 is disposed to engage either of the straps 23 and in reversing the receptacle, as above explained, the strap 22 is also reversed. When the receptacle is arranged as shown in Fig. 1 of the drawings, it will be observed that the strap 22 is preferably engaged with the loop of the strap 23 disposed adjacent the bottom of the receptacle, while in the reversed position of the receptacle as shown in Fig. 2 of the drawings, the strap 22 is preferably engaged with the uppermost loop of the strap 23.

In Fig. 4 of the drawings, I have shown the strap 22 detached from the post of the bicycle in order that relatively large bundles or packages may be inserted within the receptacle. This may be readily accomplished by sliding the receptacle along the adjacent arm of the handle bars to the position shown in this figure, the flexibility of the receptacle permitting the free edge of the walls thereof to be so stretched as to conform to the contour of the handle bars. This is obviously a feature of advantage in that relatively large articles may be inserted within the receptacle as well as small articles.

An exceedingly simple package and article carrier is thus provided which may be readily attached to or detached from the handle bars of a bicycle, and which may be readily manufactured and sold for use in connection with bicycles as now upon the market.

Having thus described my invention what I claim and desire to secure by Letters Patent is:

1. A device of the character described including a reversible receptacle having angularly disposed sides, a hem formed on the free edge of the side wall of the receptacle, said side wall having apertures formed therein adjacent the hem, said apertures being adapted to receive one arm of the handle bars of a bicycle, and means detachably engaging the receptacle and disposed to hold the receptacle against transverse movement.

2. A device of the character described adapted for attachment to the handle bars of a bicycle and including a reversible receptacle having angularly disposed sides, straps connected to the receptacle upon opposite sides thereof, said straps each providing vertically arranged loops, and a strap adapted to detachably engage one at a time the loops formed by each of said first mentioned straps, said last mentioned strap being arranged to connect the receptacle to the post of a bicycle.

3. A device of the character described including a receptacle having oppositely disposed apertures formed in the side walls thereof, said apertures being adapted to receive one arm of the handle bars of a bicycle to support the receptacle, said receptacle being adapted to be received between the adjacent arm of the handle bars and the steering post thereof, with the upper edge and one side thereof arranged substantially parallel with said arm of the handle bars and the steering post and the receptacle being reversible to fit handle bars extending at a different angle from the steering post.

4. A device of the character described including a receptacle having an inclined upper edge and provided with angularly disposed sides, said receptacle being adapted to be supported by one arm of the handle bars of a bicycle and being reversible to fit between one arm of the handle bars and the steering post of the bicycle, with one of its sides and the upper edge thereof arranged substantially parallel with the steering post and the said arm when used in connection with bicycles wherein the handle bars extend at different angles from the steering posts thereof.

In testimony whereof I affix my signature in presence of two witnesses.

WILLIAM M. APPLE. [L. S.]

Witnesses:
G. C. CRANDALL,
Mrs. W. M. APPLE.

Copies of this patent may be obtained for five cents each, by addressing the "Commissioner of Patents, Washington, D. C."